United States Patent [19]
Rovenolt et al.

[11] Patent Number: 5,521,997
[45] Date of Patent: May 28, 1996

[54] ROTATABLY POLARIZING KEYING ELEMENT FOR A POLARIZED CONNECTOR

[75] Inventors: Fredrick L. Rovenolt, Wellsville; Gregory A. Livingston, Highspire; John L. Raybuck, Middletown; Ronald A. Hileman, Camp Hill, all of Pa.

[73] Assignee: The Whitaker Corporation, Wilmington, Del.

[21] Appl. No.: 396,406

[22] Filed: Feb. 28, 1995

[51] Int. Cl.$^6$ .................................................. G02B 6/36
[52] U.S. Cl. ................................ 385/77; 385/75; 385/78
[58] Field of Search .............................. 385/53, 55, 56, 385/58, 60, 70, 72, 75, 77, 78, 88

[56] References Cited

U.S. PATENT DOCUMENTS

| | | | |
|---|---|---|---|
| 4,979,792 | 12/1990 | Weber et al. | 350/96.20 |
| 5,041,025 | 8/1991 | Haitmanek | 439/681 |
| 5,166,995 | 11/1992 | Briggs et al. | 385/58 |
| 5,167,542 | 12/1992 | Haitmanek | 439/681 |
| 5,214,731 | 5/1993 | Chang et al. | 385/69 |
| 5,265,181 | 11/1993 | Chang | 385/75 |
| 5,289,554 | 2/1994 | Cubukciyan et al. | 385/76 |
| 5,335,301 | 8/1994 | Newman et al. | 385/75 |

*Primary Examiner*—John D. Lee
*Attorney, Agent, or Firm*—June B. Schuette

[57] ABSTRACT

A polarized connector comprises a connector body having an opening for receiving a polarization key. The key comprises a polarization member and slotted shaft rotatable in the opening about a longitudinal axis. The slotted shaft permits user access to the key to rotate the key within the opening in the connector. The polarized connectors described herein permits simple polarization changes with a single key element that is retained with the connector for all polarization configurations.

8 Claims, 6 Drawing Sheets

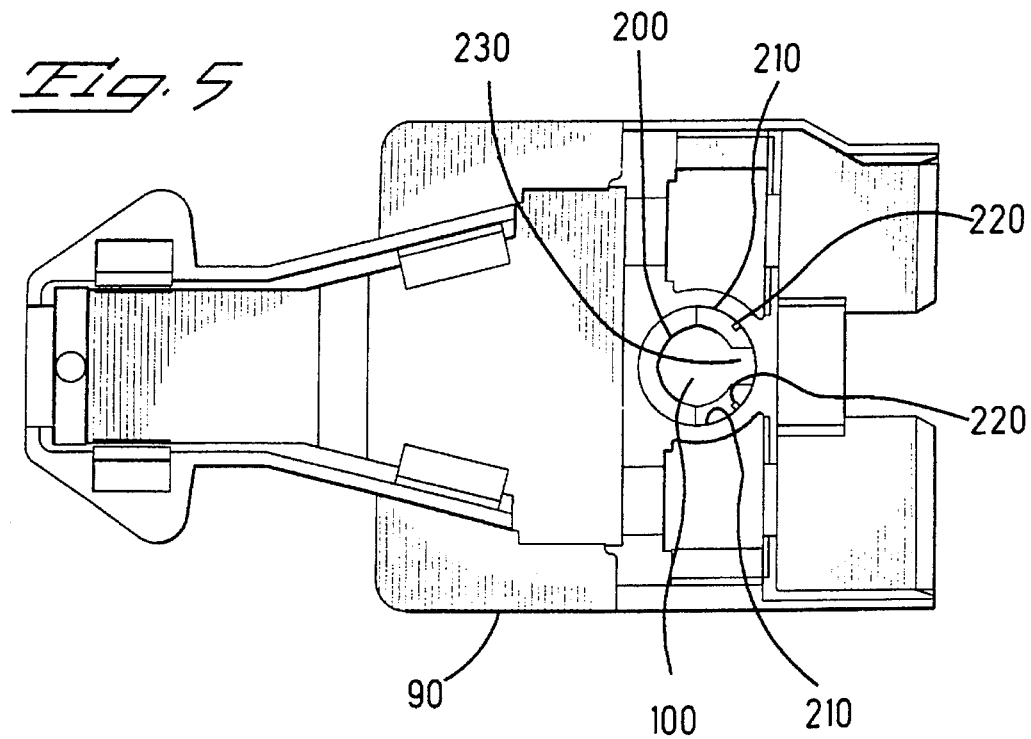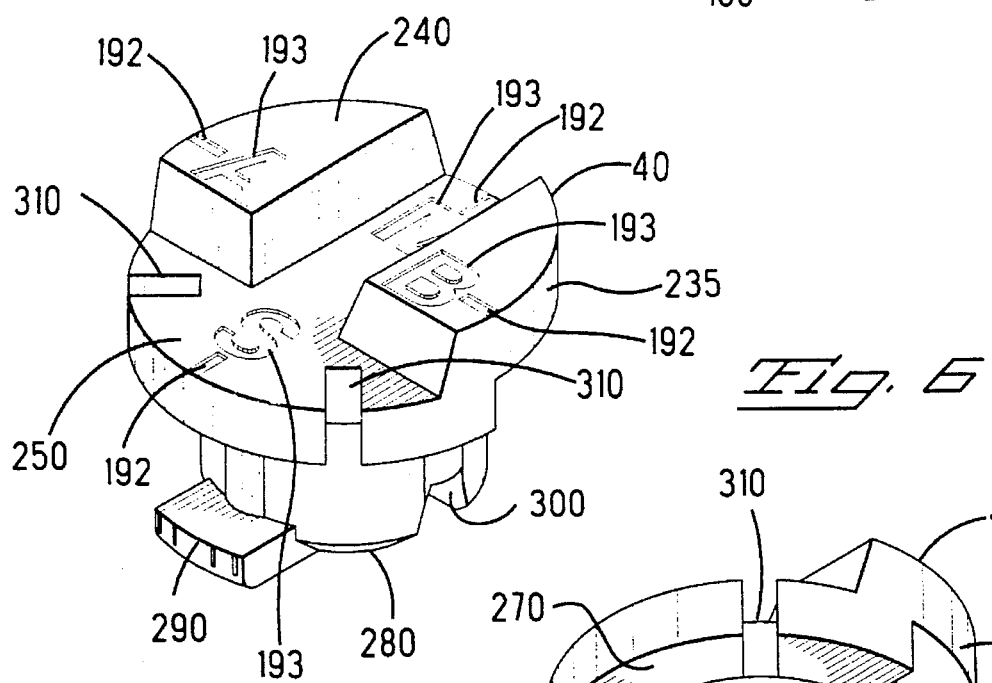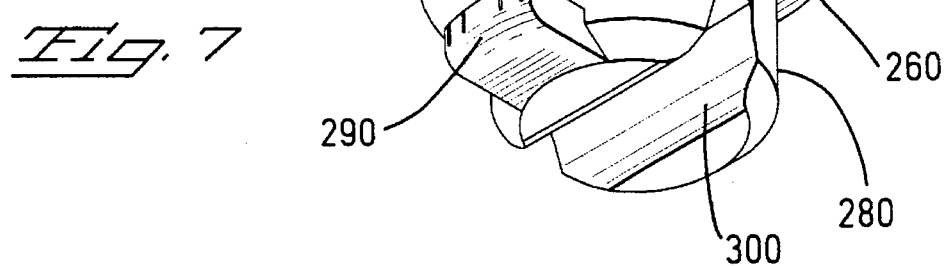

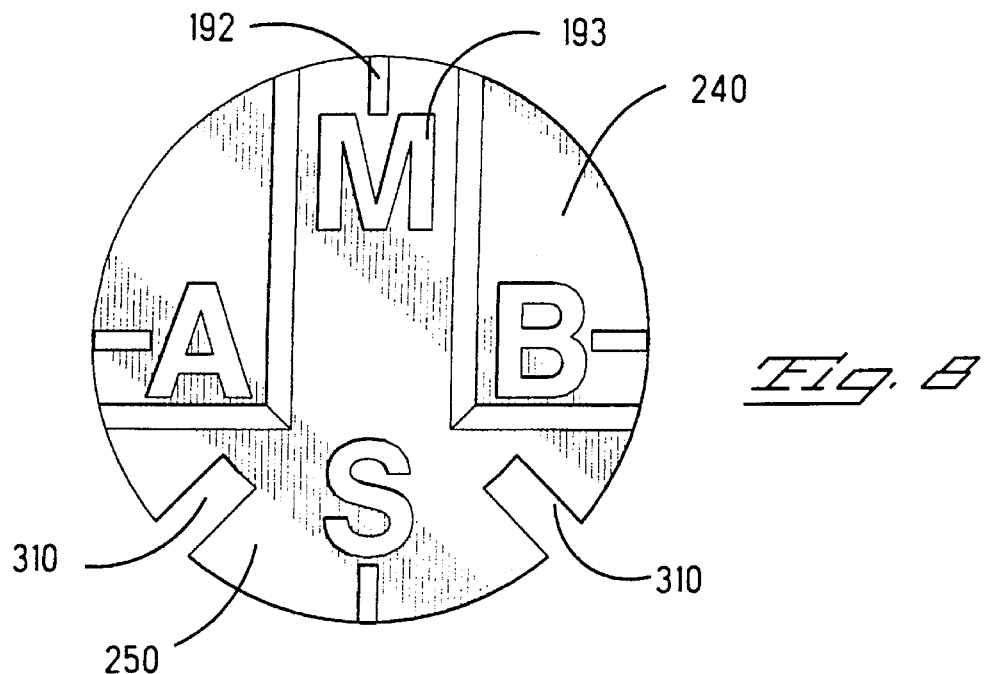
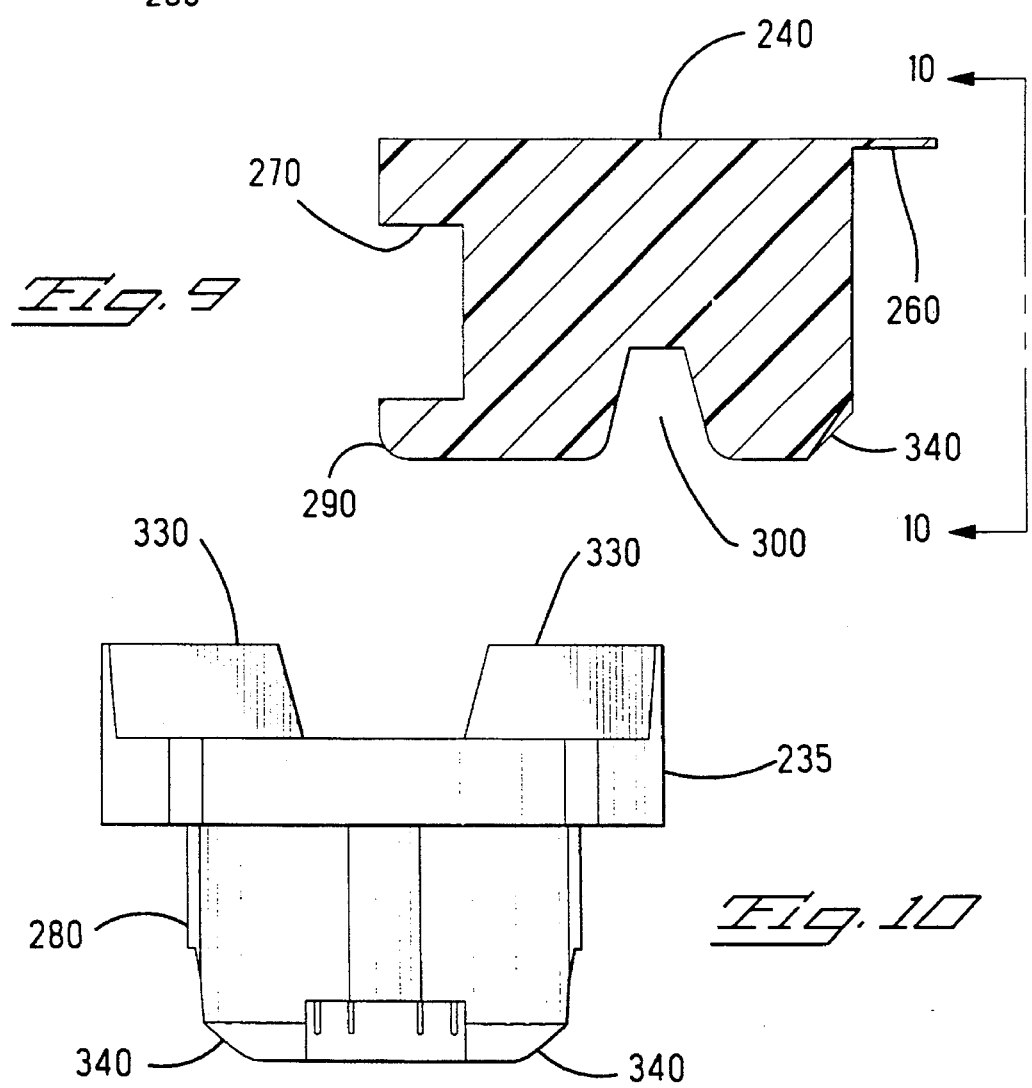

5,521,997

ROTATABLY POLARIZING KEYING ELEMENT FOR A POLARIZED CONNECTOR

FIELD OF THE INVENTION

This invention relates generally to polarized connectors and, more particularly, to a keying element for configuring a connector to one of several allowed polarizations.

BACKGROUND OF THE INVENTION

Fiber Distributed Data Interface (FDDI) connectors are used for data transmission in, among other things, computer systems and particularly local area networks. Typical FDDI connectors include a connector body having an entrance at one end for receiving a fiber optic cable. The fiber optic cable breaks out inside the connector body into two separate optical fibers that are attached to, and terminate in, two ferrules. The connector body mates with one of several different receptacles including, for example, an active device receptacle, a transceiver adaptor, a dual ST-coupling, or an FDDI to FDDI coupling.

The receptacles typically include a spline cooperating with a connector key or polarizing element to ensure that the particular receptacle being used is compatible with the mated connector. See U.S. Pat. No. 5,166,995 to Weber, the teachings of which are specifically incorporated herein by reference. There are generally four basic keying formats in the American National Standards Institute (ANSI) protocol, that is the A, B, M ("Master")and S ("Slave") polarizations as disclosed in FDDI:X3.166-1990; ISO/IEC 9314-3 and X3T9.5/88-155 the teachings of which are hereby incorporated by reference. The polarizations are achieved by the size and placement the spline in the cooperating receptacle. For example, a connector polarized in the S configuration has a centrally disposed full width channel. The "A" polarization is a partial width channel located to the right of center, while the "B" polarization is a partial width channel located to the left of center. The "M" polarization is a partial width channel located at the center of the connector.

In order to avoid molding different connector bodies to accommodate the four different polarization possibilities, prior connectors have been designed with three separate and different keying elements that fit into the connector to configure the connector to the desired polarization. The connector housing itself has a full width central channel for the S polarization. To configure the connector to the A, B, or M polarizations, a polarizing key having an appropriately sized and placed channel is placed in the full width channel in the connector body. See, for example, U.S. Pat. No. 4,979,792, Weber et al. the teachings of which are incorporated herein by reference.

The keying system disclosed in the Weber patent requires multiple keys for each connector kit. In order to accommodate the possibility of changing connector polarizations, multiple unused keys must be retained together with the associated connector. See for example U.S. Pat. No. 4,979,792 to Weber et al. Keying systems having a single keying element for each polarization obviate the need to retain multiple unused parts. Single keys tend to be small making them difficult to manipulate. There is a need, therefore, for a single key polarization system that is easily manipulated for changing polarization modes.

SUMMARY OF THE INVENTION

It is an object of the present invention to provide a single polarization key that may be retained with the connector for all polarization positions.

It is an object of the present invention to provide a polarization key that is easily manipulated to change connector polarizations.

A polarized connector comprises a connector body having an opening. The opening receives a polarization key. The key comprises a substantially circular polarizing member having a longitudinal axis. The key is rotatable about the longitudinal axis within the opening.

It is a feature of the present invention that a single key provides for all available polarizations.

It is a feature of the present invention that a polarization key is rotated within an opening in a polarized connector to configure the connector.

It is an advantage of the present invention that a polarization key remains with the connector for all polarizations.

It is an advantage of the present invention that the polarization key is easily manipulated with standard instruments.

BRIEF DESCRIPTION OF THE DRAWINGS

FIG. 5 is a plan view of the bottom half of the connector shown in FIG. 4.

FIG. 6 is an perspective, top view of a preferred embodiment of a multimode polarization key according to the teachings of the present invention.

FIG. 7 is an perspective, bottom view of the polarization key of FIG. 6.

FIG. 8 is a plan view of the top surface of a multimode polarization key according to the teachings of the present invention.

FIG. 9 is a cross-sectional, side view of a polarization key according to the teachings of the present invention.

FIG. 10 is a view of the polarization key of FIG. 9 taken along the 10—10 line thereof.

DETAILED DESCRIPTION OF PREFERRED EMBODIMENTS

Figure 1:
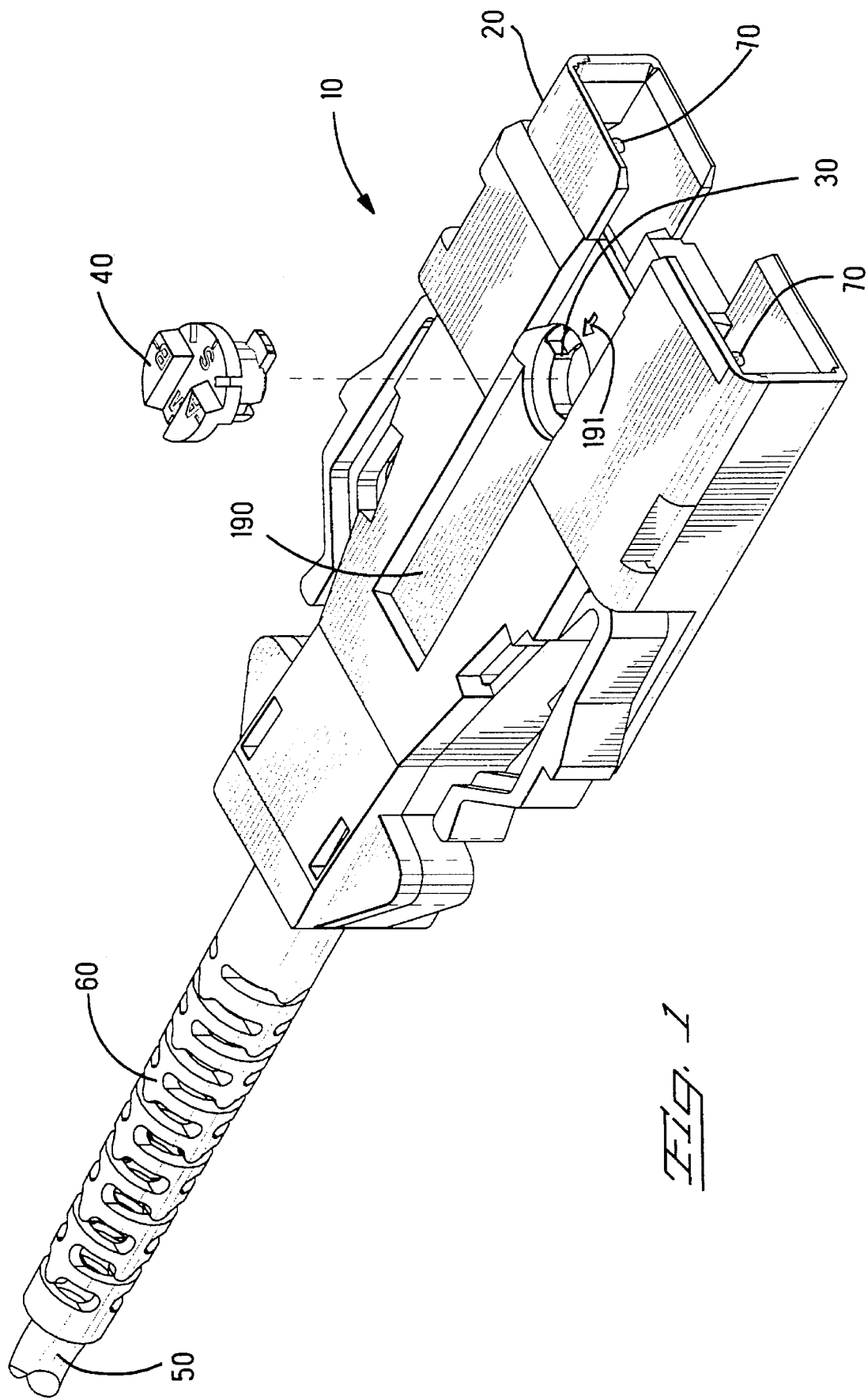
FIG. 1 is an perspective view of an FDDI connector having a key according to the teachings of the present invention.
Figure 2:
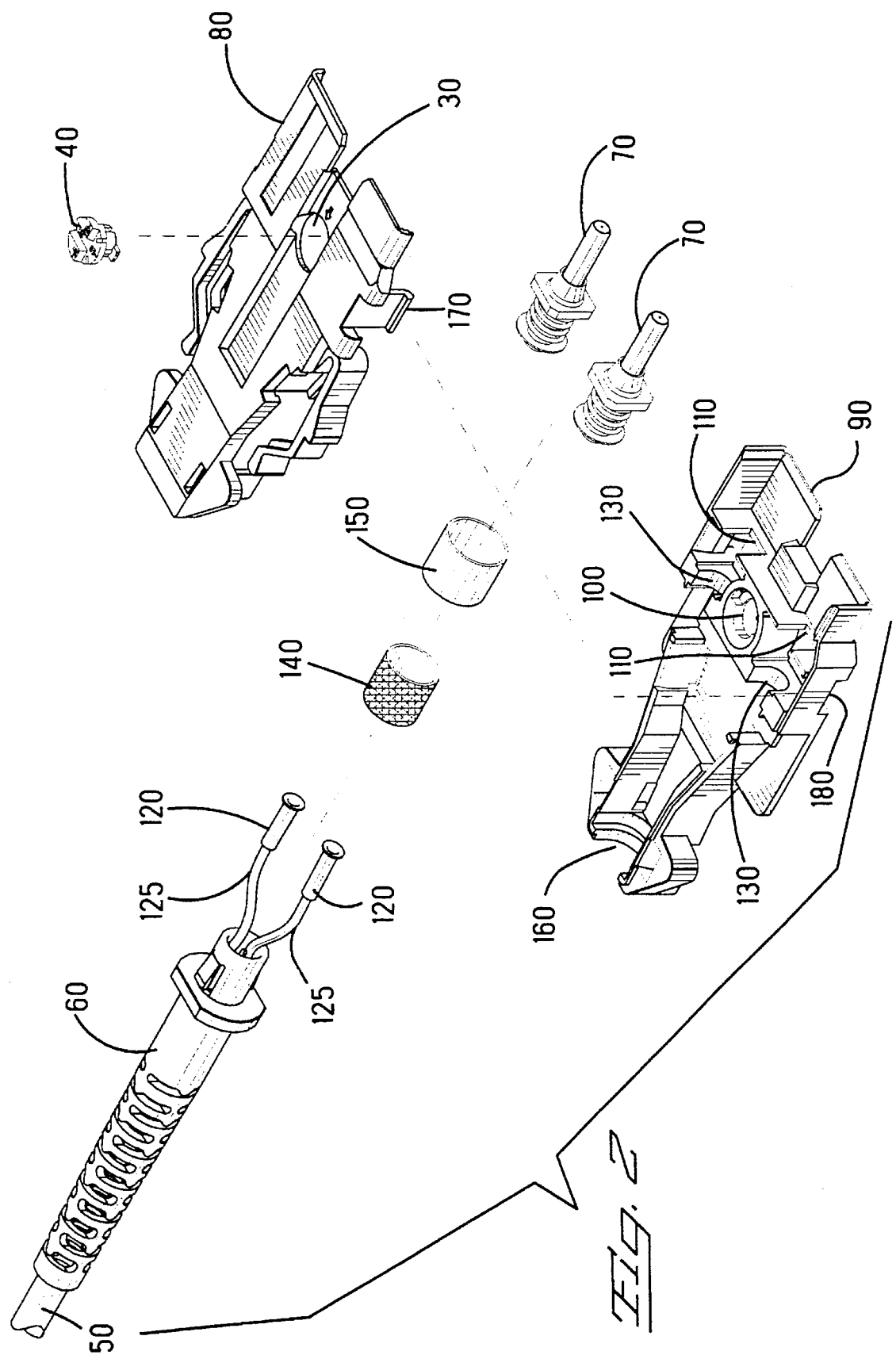
FIG. 2 is an exploded, perspective view of the connector of FIG. 1.

Referring now to the drawings wherein like reference numerals refer to like elements, polarized FDDI connector is shown in FIG. 1. While the present invention is particularly suited for FDDI style connectors and devices, it will be recognized by those with skill in the art that the polarized connectors and keys described and claimed herein will be useful for any connector which must operate according to multiple polarizations.

Connector 10 comprises a connector body 20 having a channel 190 with an opening 30 therein to receive a polarization key 40. The key 40 mechanically rotates in the opening 30 to an appropriate position to change the polarization of the connector 10. The connector 10 houses a fiber optic cable 50 protected by bend relief element 60 as is conventionally known in the art. Inside the connector 10, the fiber optic cable 50 is distributed and preferably terminates in at least two ferrules 70. The connector 10 mates with a receptacle (not shown) having a polarizing spline member. The connector 10 comprises a top half 80, shown in FIG. 3, and a bottom half 90, shown in FIG. 4, molded from a thermoplastic material such as polyester or nylon. The channel 190 and opening 30 are molded in the top half 80 of the connector 10 to receive the polarization key 40 therein. A bottom half 90 is molded with reciprocal receiving element 100 having a size and position corresponding to the opening 30. To assemble the connector 10, the terminated ferrules 70 and fibers 50 are placed in their respective positions in the bottom half 90 of the connector 10. The top half 80 of the connector 10 is latched to the bottom half 90 to form an FDDI connector as shown substantially in FIG. 1 with opening 30 and reciprocal receiving element in substantial alignment. Polarization key 40 is inserted into opening 30 and reciprocal receiving element 100 where the key may be rotated to complete the assembly.

Figure 3:
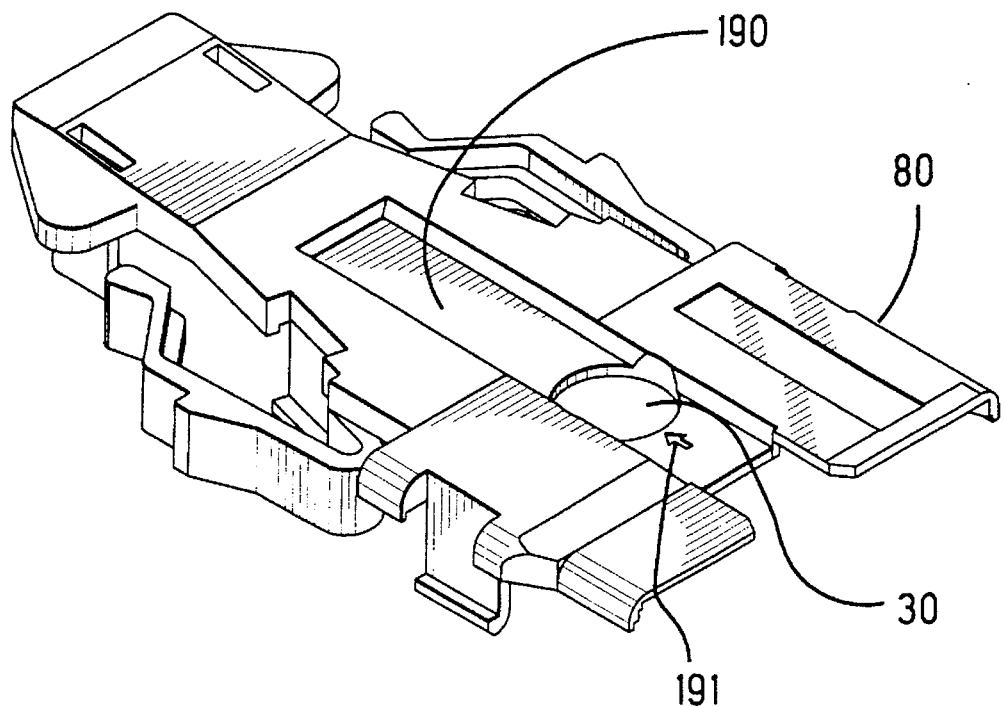
FIG. 3 is an perspective view of the top half of the connector of FIG. 1.
Figure 4:
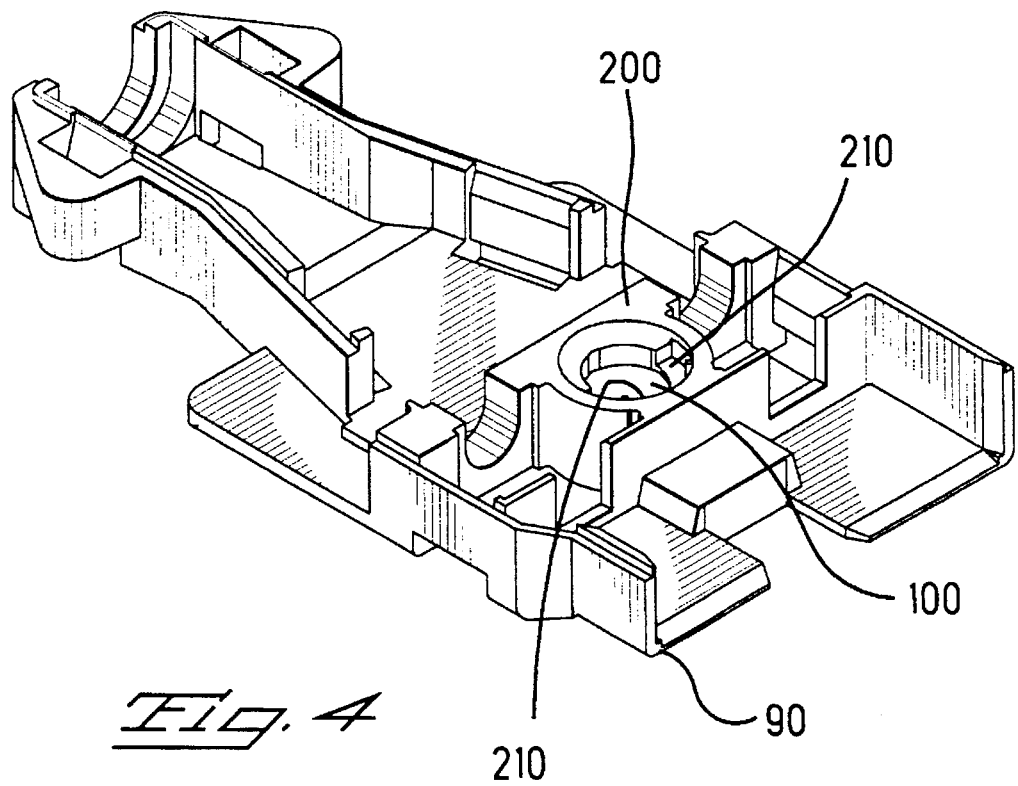
FIG. 4 is an perspective view of the bottom half of the connector of FIG. 1.
Figure 11:
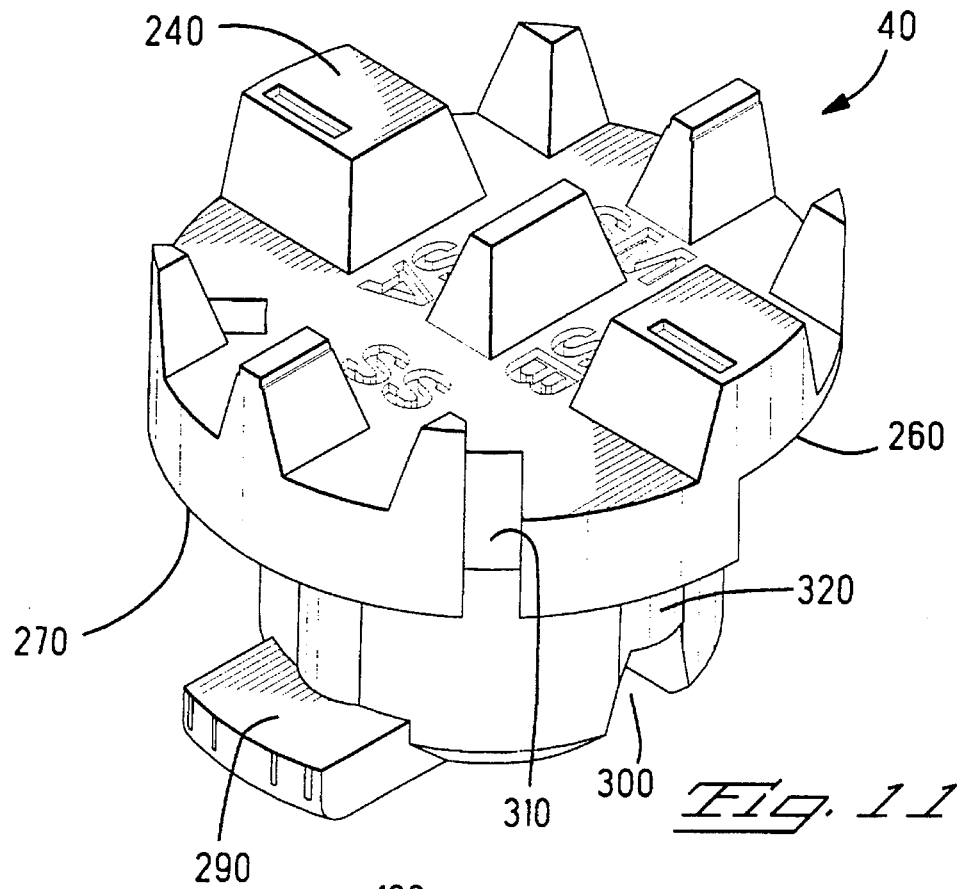
FIG. 11 is an perspective, top view of a preferred embodiment of a singlemode polarization key according to the teachings of the present invention.
Figure 12:
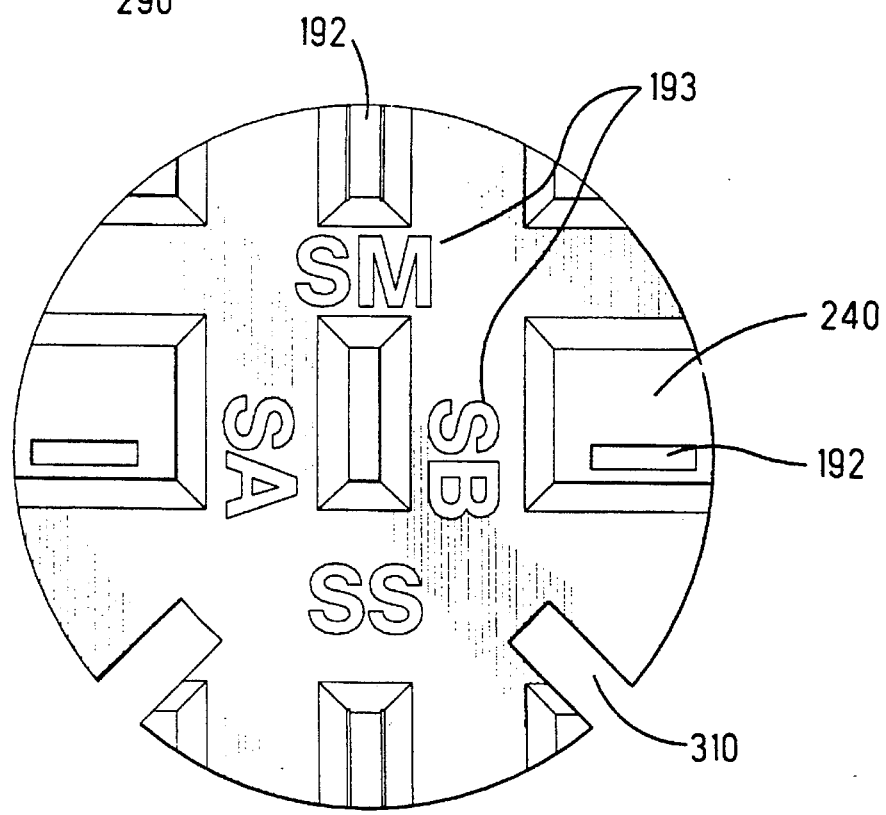
FIG. 12 is a plan view of the top surface of a singlemode polarization key according to the teachings of the present invention.

With reference to FIGS. 3 and 4, the top half 80 of connector 10 has a full width channel 190 to cooperate with the spline in a mating receptacle (not shown). As known by those with skill in the art, the spline member cooperates with a channel in the connector to ensure that the particular receptacle is compatible with the mating connector. The connector 10, therefore, is intrinsically configured for the S polarization without a polarizing element. The FDDI polarizations for multimode fiber are termed A, B, M, and S polarizations and represent the four basic polarization formats for multimode fiber. The FDDI polarizations for singlemode fiber are termed SA, SB, SM, and SS polarizations and represent the four basic polarization formats for singlemode fiber.

With reference to FIGS. 6, 7, 11, and 12, polarization key 40 comprises a polarization member 235 having a profiled top surface 240. The profiled top surface 240 provides three of the four different polarizations in accordance with the ANSI standard for either multimode or singlemode fiber. The polarization member is received by opening 30 and rotates therein to configure the connector from the intrinsic S polarization to one of the A, B, or M polarizations. The top half 80 of the connector 10 has an alignment arrow 191 molded in relief in the channel 190 and pointing toward the opening 30. The polarization member 235 has cooperating alignment markers 192 and polarizations labels 193 for each polarization. For example, for the M polarization configuration, the polarization member 235 is rotated until alignment marker 192 associated with polarization label 193 aligns with alignment arrow 191. The profiled top surface 240 presents a partial width channel central to the full width channel 190. Opposite sides of the polarization member 235, therefore, interfere with the full width of the channel to prevent a receptacle configured in the S polarization to mate with a connector configured in the M polarization. A connector having the polarizing member 235 positioned for the M configuration will mate only with a partial width central spline (corresponding to an M receptacle configuration). Similarly, for the A and B polarizations, the polarization member 235 is rotated until the respective alignment markers 192 align with the alignment arrow 191 in which a partial width left or right of center channel is presented to a cooperating spline in a mating receptacle.

The reciprocal receiving element 100 comprises a landing 200 and a pair of secondary boss members 210. The secondary boss members 210 are separated by a cutout portion 230. Secondary boss members 210 and cutout portion 230 are molded in the reciprocal receiving element 100 at a lower position than the landing 200, and are adapted to interact with surfaces on the polarization key 40 when the FDDI connector is set to the S configuration. The bottom of polarization member 235 is stepped having first bottom surface 260 in a different but parallel plane to a second bottom surface 270. In the S configuration, the bottom surfaces 260,270 interfit with the reciprocal receiving element 100. The first bottom surface 260 engages the landing 200 and a second bottom surface 270 engages the boss members 210. In this position, the polarization member 235 is recessed into the connector 10 and top surface 240 is flush with the floor of channel 190. With the polarization member recessed in this manner, the connector presents the full width channel intrinsic to the connector to a mating receptacle. The polarization key 40, therefore, remains installed in the connector for the S polarization and does not interfere in the channel 190.

With reference to FIG. 5 which is a plan view of the bottom half 90 of the connector, a post 220 is molded in each boss member 210 and extends upwardly therefrom. The polarizing member 235 has a pair of slots 310 oriented 90 degrees from each other. The slots 310 receive the posts 220 in reciprocal receiving element 100 in a friction fit when the polarization member 235 is in the S position. The cooperation between the posts 220 and the slots 310 serves to retain the recessed polarization member 235 in reciprocal receiving element 100 through frictional interference for the S polarization. The top of posts 220 are coplanar with the landing 200. When the polarization member 235 is in the A or B configurations, half of first bottom surface 270 rests on the landing. The other half of first bottom surface 270 rests on one of the posts 220 for reasons of polarization member 235 stabilization. When the polarization member 235 is in the M configuration, the entire surface 270 rests on the landing 200.

The polarization key 40 further comprises a shaft 280 that extends substantially from the bottom surfaces 260,270 of the polarization member 235 downward through the connector 10 and into the reciprocal receiving element 100. The shaft 280 is slotted at 300, extends through the bottom half 90 of the connector 10 and is externally exposed. A flat-edged screwdriver or other instrument may be interfaced with the slotted shaft 280 to rotate the polarization key 40. An outer edge of shaft 280 is preferably bevelled at 340 to permit insertion of the polarization key 40 into opening 30 and reciprocal receiving element 100. The shaft 280 has four detents 320 equally spaced on its outer periphery. The detents 320 resiliently press against the inner wall of the reciprocal receiving element 100 in a frictional interference fit.

A locking projection 290 is positioned on the shaft 280 at an end opposite the polarizing member 235. The locking projection 290 fits within the cutout portion 230 in the reciprocal receiving element 100 when the key 40 is placed in the default or S position. When the key 40 rotates to the A, B, or M polarizations, the locking tab 290 passes below the secondary boss members 210 preventing disassociation of the key 40 from the connector 10. It will be recognized that the polarization key 40 is molded from a similar material as the connector 10, that is, a polyester or equivalent material. In a preferred embodiment, a polyester material is used to mold the polarization key and FDDI connector and is sold under the trademark VALOX, available from the General Electric Company.

There have thus been described certain preferred embodiments of polarized connector and polarization keys provided according to the teachings of the present invention. While preferred embodiments have been described and disclosed, it will be recognized by those with skill in the art that modifications are within the true spirit and scope of the invention. The appended claims are intended to cover all such modifications.

We claim:

1. A polarized connector comprising:
   a connector having a channel, a substantially circular opening, and a receiving element,
   a polarization member received by and rotatable within said opening, said polarization member having a plurality of rotational orientations corresponding to connector polarization modes wherein said polarization member is received by said receiving element in one of the polarization modes such that a top surface of said polarization member is flush with a bottom surface of said channel.

2. The polarized connector as recited in claim 1 wherein said receiving element comprises a landing and a secondary boss member.

3. The polarized connector as recited in claim 2, said receiving element further comprising at least one post extending upwardly therefrom, the top of said post being coplanar with said landing, and wherein said polarization member key has at least one slot corresponding to and receiving said post.

4. The polarized connector as recited in claim 1 further comprising a slotted shaft and a locking projection on said shaft.

5. The polarized connector as recited in claim 4 wherein said polarization member and said shaft are molded as a unitary body.

6. The polarized connector as recited in claim 4 wherein said shaft further comprises at least one detent on a circumferential periphery of said shaft.

7. The polarized connector as recited in claim 1 wherein said polarization member comprises a multimode polarization profile on a top surface of said polarization member.

8. The polarized connector as recited in claim 1 wherein said polarization member comprises a singlemode polarization profile on a top surface of said polarization member.

* * * * *